(12) United States Patent
Esnault

(10) Patent No.: US 7,095,954 B2
(45) Date of Patent: Aug. 22, 2006

(54) CHOCOLATE FOUNTAIN APPARATUS WITH OUTPUT PORT

(76) Inventor: Michel Esnault, 9680 rue Airlie, Montréal (CA) H8R 2B9

( * ) Notice: Subject to any disclaimer, the term of this patent is extended or adjusted under 35 U.S.C. 154(b) by 29 days.

(21) Appl. No.: 10/942,947

(22) Filed: Sep. 17, 2004

(65) Prior Publication Data

US 2006/0083497 A1    Apr. 20, 2006

(51) Int. Cl.
  *F24H 1/18*  (2006.01)
(52) U.S. Cl. .................................. 392/442; 222/146.5
(58) Field of Classification Search ..................... None
  See application file for complete search history.

(56) References Cited

U.S. PATENT DOCUMENTS

| | | | |
|---|---|---|---|
| 3,739,711 A | 6/1973 | Nieblach | |
| 4,094,446 A * | 6/1978 | Brutsman | 222/146.5 |
| 4,544,085 A * | 10/1985 | Frazer | 222/146.4 |
| 4,628,803 A | 12/1986 | Bonora et al. | |
| 4,941,597 A * | 7/1990 | Lopez et al. | 222/146.5 |
| 5,152,212 A | 10/1992 | Chauvreau | |
| 5,372,274 A | 12/1994 | Freedland | |
| 5,450,786 A | 9/1995 | Müntener | |
| 5,609,835 A | 3/1997 | Pitcher | |
| 5,833,363 A | 11/1998 | Gmeiner | |
| 6,047,631 A | 4/2000 | Müntener | |

* cited by examiner

*Primary Examiner*—Thor S. Campbell
(74) *Attorney, Agent, or Firm*—Protections Equinox Franz Bonsang, Patent Agent; Franz Bonsang, Patent Agent

(57) ABSTRACT

A fountain apparatus for use with a flowable food media includes a recipient for receiving the food media therein, a recipient and an output port. The recipient is heatable within a predetermined temperature range for maintaining the food media within the temperature range. The output port connects to the recipient downstream of an aperture extending through a wall thereof and has a passageway extending there through for receiving the food media from the aperture. The passageway defines an inlet opening that is in fluid communication with the recipient via the aperture and an outlet opening that has an opening mechanism to selectively control the opening thereof. A heating member is thermally connected to the output port for warming up the same to maintain the food media therein within the temperature range.

12 Claims, 4 Drawing Sheets

CHOCOLATE FOUNTAIN APPARATUS WITH OUTPUT PORT

FIELD OF THE INVENTION

The present invention relates to a flowable food fountain apparatus, and is more particularly concerned with an output port connected to a fountain apparatus for flowable food serving and draining.

BACKGROUND OF THE INVENTION

It is well known in the art to have various types of fountains accommodating fluids. More specifically, fountains for eatable viscous fluids such as chocolate have been commercialized since approximately 1995. Cleaning such apparatuses after use has however been very unpractical especially considering the weight of the equipment. Since for example the chocolate left on the machine hardens or cures relatively quickly once a heating element is stopped, warm and soapy water will usually be necessary for removing all the residual hardened fluid left in the recipient of the fountain and on different accompanying pieces of the equipment. The weight and size of the apparatus makes it difficult to lean it on the side to remove the dirty water from the recipient, put it back upward for rinsing, etc. It would be extremely inconvenient also to dismantle the apparatus for immersion of each part in a water basin for example, especially considering the motorized components, etc.

Another drawback of a chocolate fountain is that a continuous curtain-like of chocolate usually falls from the tiers. This, which can be appropriate when a fruit on a fork is for example brought underneath the chocolate-curtain, would leave unpleasant marks on the side of a fruit cup, sundae cup or ice-cream cone, and even on the fingers of a user, when the container would be brought underneath the same chocolate-curtain to offer a chocolate topping.

Drains as opposed to distributors, for various apparatuses in the food industry or others, even in chocolate mass production equipment or conches, are already well known but not specifically in chocolate fountains. In U.S. Pat. No. 3,739,711 issued to Nieblach on Jun. 19, 1973, an apparatus for the production of toffee-soft-caramel and similar masses provides an outlet at the lowermost position to empty the vessel. The outlet however is not specifically heated even if said outlet is in close proximity to a heat conduit. Furthermore, the oulet does not specifically need to be warm since hot water or the like could be dispensed there through for the cleaning operation. Similarly, U.S. Pat. No. 4,628,803 issued to Bonora et al. on Dec. 16, 1986 shows an autoclave for cocoa liquor with a discharge port. U.S. Pat. No. 5,152,212 issued to Chauvreau on Sep. 6, 1992 discloses a reaction vessel with an outlet connection, again not specifically heated. U.S. Pat. No. 5,372,274 issued to Freedland on Dec. 13, 1994 shows a container for food product with a possibility of heating the walls combined to non-heated drain ports and a receptacle tray. U.S. Pat. No. 5,450,786 issued to Müntener on Sep. 19, 1995 presents a conching device with discharge openings. U.S. Pat. No. 5,609,835 issued to Pitcher on Mar. 11, 1997 shows another apparatus with a non-heated outlet. Also, the container outlet of the mixing and degassing device disclosed in U.S. Pat. No. 5,833,363 issued to Gmeiner on Nov. 10, 1998 is not heated as well. U.S. Pat. No. 6,047,631 issued to Müntener on Apr. 11, 2000 has a vessel with also a non-heated pipe connection as an outflow.

U.S. Pat. No. 5,560,284 issued to Weidman et al. on Oct. 1, 1996 is one of many examples of beverage brewing apparatus for coffee and the like including a warming element, a pipe portion and a faucet, but wherein the pipe portion is not specifically heated. Furthermore, the apparatus is not designed for dispensing flowable food like melted chocolate. U.S. Patent Application Publication No. 2003/0129921 filed on Jan. 9, 2002 by Small et al. discloses an apparatus for dispensing chocolate using a piston or plunger system. Alternatively, a flexible bladder is used.

Accordingly, there is a need for an improved output port for a flowable food fountain.

SUMMARY OF THE INVENTION

It is therefore a general object of the present invention to provide an improved flowable food fountain apparatus.

An advantage of the present invention is that the output port of the fountain apparatus provides for a new way of entertaining guests.

Another advantage of the present invention is that the output port of the fountain apparatus provides for a simple way of serving a melted chocolate topping, at any time during the operation thereof.

Another advantage of the present invention is that the output port of the fountain apparatus is heatable to a predetermined temperature range suitable for the flowable food media used in conjunction therewith.

A further advantage of the present invention is that the output port of the fountain apparatus provides for an easy way to empty and clean the apparatus.

Still another advantage of the present invention is that the output port of the fountain apparatus provides for various interchangeable dispensing faucet heads, depending on the users' specific needs.

According to an aspect of the present invention, there is provided a fountain apparatus for use with a flowable food media, said apparatus comprises: a recipient for selectively receiving the flowable food media therein, said recipient being heatable within a predetermined temperature range for maintaining the flowable food media within said predetermined temperature range, said recipient having an aperture extending through a wall thereof; an output port connecting to said recipient downstream of said aperture, said output port having a passageway extending therethrough for receiving the flowable food media from said aperture, said passageway defining an inlet opening being in fluid communication with said recipient via said aperture and an outlet opening, said outlet opening having an opening mechanism to selectively control opening thereof; a heating means thermally connected to said output port for warming said output port to maintain the flowable food media therein within said predetermined temperature range.

In one embodiment, the heating means is a thermally conductive connection between said output port adjacent said inlet opening and said recipient so that said recipient heats up said output port through said thermally conductive connection.

In one embodiment, the heating means is at least one heating element mounted on an external surface of said output port between said inlet and outlet openings.

In one embodiment, the apparatus further includes a heater element operatively connected to said recipient, said heater element being located within a heater chamber adjacent said recipient to maintain said recipient within said predetermined temperature range.

Typically, the apparatus further includes an output port chamber enclosing at least a portion of said output port, said output port chamber being in fluid communication with said heater chamber so as to warm up said output port within said predetermined temperature range; whereby said heater element forms said heating means.

Typically, the output port chamber is an extension of said heater chamber.

In one embodiment, at least a portion of said output port extends through said heater chamber so as to warm up said output port within said predetermined temperature range; whereby said heater element forms said heating means.

In one embodiment, the opening mechanism includes a valve operatively connected to an actuator.

Typically, the actuator is a manual actuator for selective operation by a user.

In one embodiment, the output port includes a spout removably connecting thereto and being in fluid communication with said outlet opening.

Typically, the spout includes a plurality of orifices, said orifices being angled from one another so as to provide respective output flows.

Other objects and advantages of the present invention will become apparent from a careful reading of the detailed description provided herein, with appropriate reference to the accompanying drawings.

BRIEF DESCRIPTION OF THE DRAWINGS

Further aspects and advantages of the present invention will become better understood with reference to the description in association with the following Figures, wherein.

DETAILED DESCRIPTION OF THE PREFERRED EMBODIMENTS

With reference to the annexed drawings the preferred embodiments of the present invention will be herein described for indicative purpose and by no means as of limitation.

Figure 1:
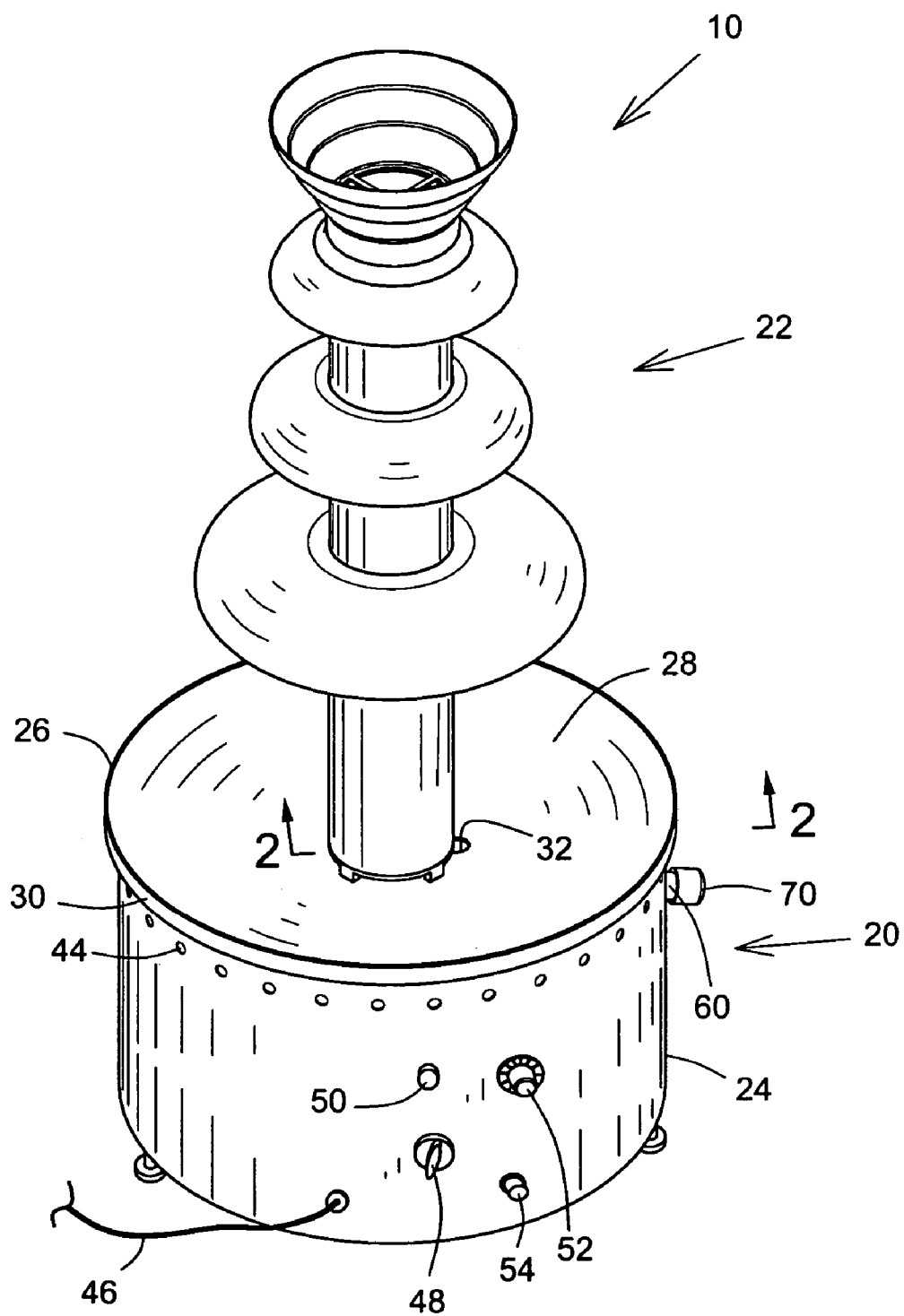
FIG. 1 is a top perspective view of a fountain apparatus in accordance with an embodiment of the present invention.
Figure 2:
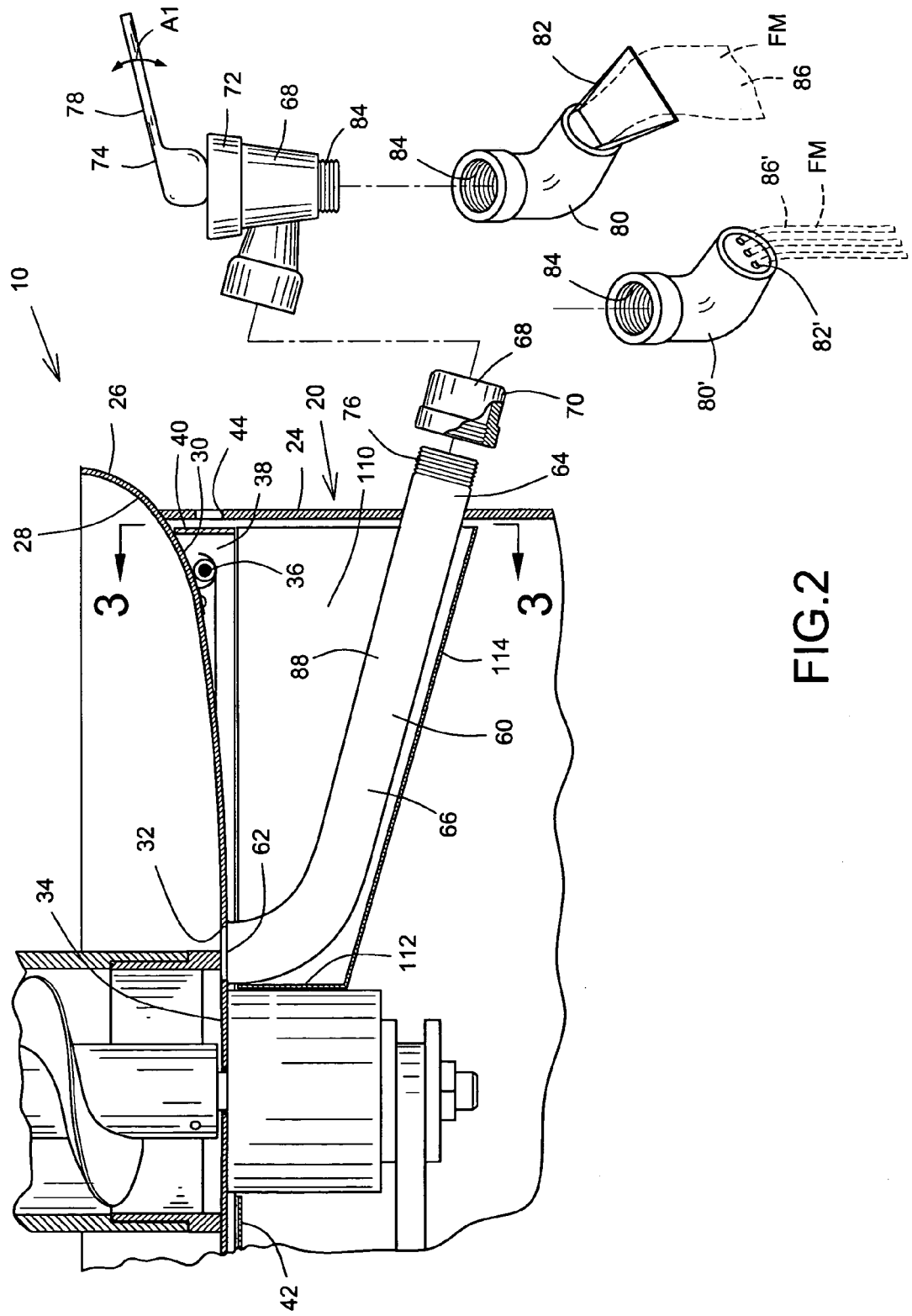
FIG. 2 is a partial section view taken along line 2—2 of FIG. 1, showing an output port, a heating chamber, a valve and actuator, and a series of spouts.
Figure 2A:
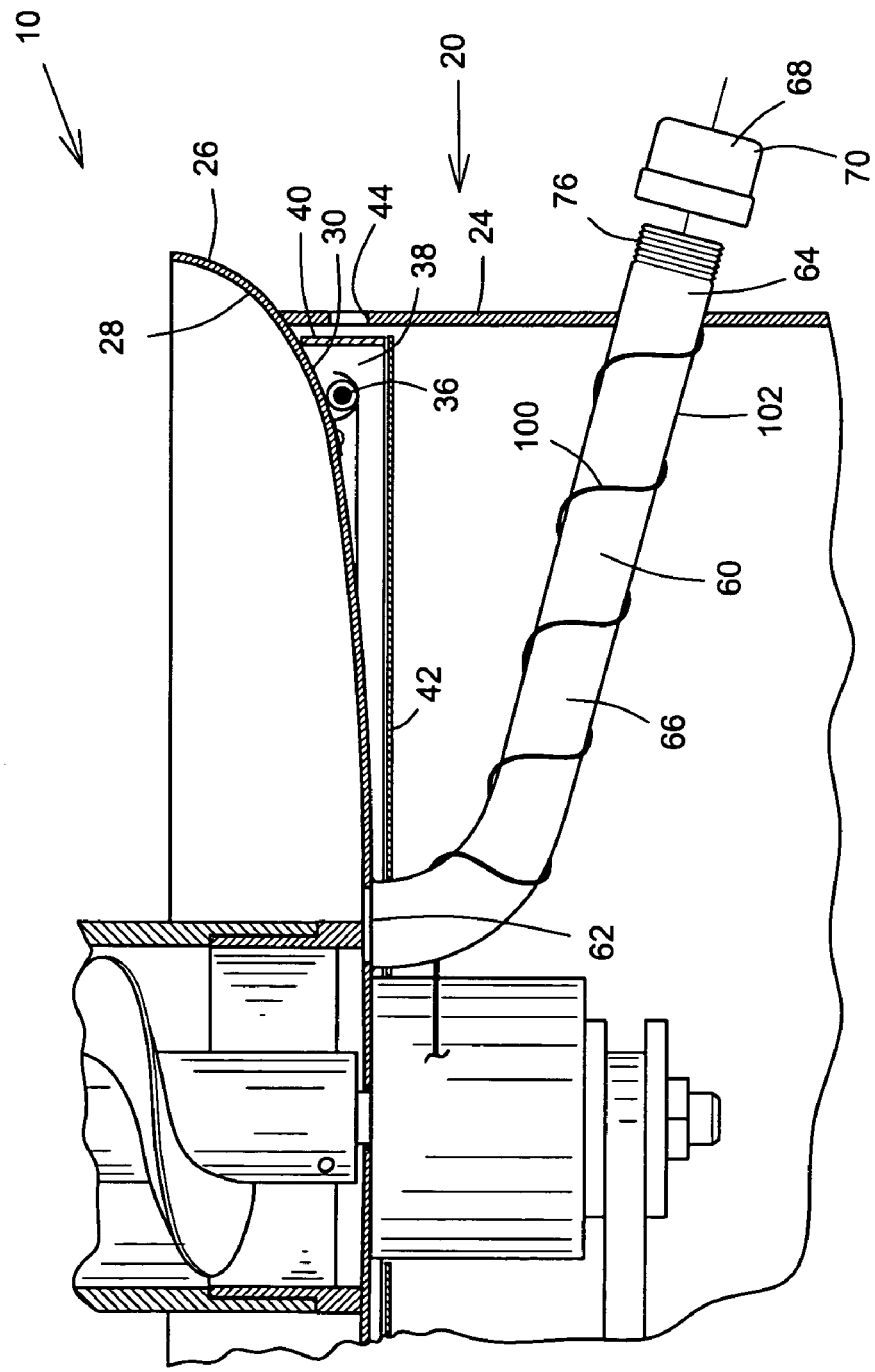
FIG. 2a is a partial section view similar to that of FIG. 2, showing an output port's heating element.

As shown in FIG. 1, an apparatus 10 presenting a fountain for a flowable food media FM (shown in FIG. 2) such as fluid or melted chocolate or the like in accordance with an embodiment of the present invention includes a lower section 20 and an upper section 22. The lower section 20 includes a preferably cylindrical and hollow stand 24 and a recipient 26 resting on top of and generally covering the stand 24. As also shown in FIGS. 2 and 2a, the recipient 26 is preferably a concave bowl or pan and defines a concave cavity formed with a recipient wall or concave inner surface 28 and a preferably convex outer surface 30. An aperture 32 in the recipient 26 is provided adjacent an apex region 34 of the inner surface 28 or alternatively, in proximity to the lower most horizontal part of the inner surface 28 of the recipient 26.

A heater element 36, electrical resistance or the like is secured underneath and in direct contact with the recipient 26 on the outer surface 30 opposite the inner surface 28, in an upper portion of the hollow stand 24. A heater chamber 38 is also formed by a vertical wall 40 and a generally horizontal plate 42 boxing in, in conjunction with the recipient 26, the heater element 36. The heater chamber 38 stores the thermal capacitance produced by the heater element 36 and provides a barrier so as not to heat too much the stand 24 to prevent burns if skin comes in contact with the lower section 20 whilst the apparatus 10 is in operation. Apertures 44 are also preferably provided in the stand 22 adjacent the vertical positioning of the heater chamber 38 to further help dissipate the heat that filters through the heater chamber 38. The heater element 36 is typically connected via an electrical cord 46 to an external source of electricity (not shown) and controlled by an on/off switch 48. An opened or "on" position is preferably indicated by a colored light indicator 50. A thermostat 52 is furthermore connected to the heater element 36 to control the temperature of the heater element 36 and a fuse 54 or circuit breaker offers an electrical protection. As one skilled in the art will understand and considering the material used which is heatable within a temperature range and will be described further below, when the heater element 36 is turned on via the switch 48, the recipient 26 is warmed up by thermal conduction. Further using the possible adjustment means provided by the thermostat 52, the recipient 26 and the food media FM put in the recipient 26 can therefore respectively reach and maintain a desired and preferred temperature range. One skilled in the art will also understand that the higher temperature kept in the air within the heater chamber 38 adjacent the recipient 26 also helps the adjacent recipient 26 reach and maintain the desired and preferred temperature range by thermal radiation from the heater element 36.

A heatable output port 60 includes an inlet opening 62 connected to the aperture 32 at one end thereof, an outlet opening 64 at the opposed end thereof and a passageway 66 extending between the inlet and outlet openings 62, 64. The inlet opening 62 creates a fluid communication link between the passageway 66 of the output port 60. The outlet opening 64 preferably emerges outside of the shell of the stand 22. The outlet opening 64 is connected to an opening mechanism 68. The opening mechanism 68 may include either a stopper 70 or a valve 72 combined to an actuator 74 to selectively open and/or close the valve 72. The removable stopper 70 and valve 72 can be secured onto the outlet opening 64 using various means known in the art including threads 76 for example. The actuator 74 is preferably a manual actuator 78 such as shown in the FIG. 2 or the like. When the valve 72 is used, a spout 80 including one or more orifices 82 is preferably removably secured onto the valve 72 by various means known in the art, such as threads 84 or the like for example. The orifices 82 that could be angled (diverging and/or converging) from one another provide, when the apparatus 10 is operating, specifically shaped respective output flows 86 shown in dotted lines in FIG. 2. The apparatus 10 preferably provides a series of alternative spouts including different orifices providing differently shaped output flows; examples of which are shown in FIG. 2 with respectively the numerals 80', 82' and 86' shown in dotted lines. The valve 72, spouts 80, 80' and orifices 82, 82' used appropriately operate with the desired viscosity of the food media FM utilized, such as melted chocolate.

When the apparatus 10 is operating, one or more output port heating means thermally connected to the output port 60 further provides warming to the output port 60 to maintain the flowing food media FM therein with a predetermined and preferred temperature range. As explained previously and considering the material used for the output port 60 which will be described further below, when the recipient 26 is heated up a thermal conductive connection (not shown) between the recipient 26 and the output port 60 provides a first heating means (not shown) to the output port 60.

As shown in FIG. 2*a* and preferably concomitantly to the thermal conductive connection from the recipient 26 mentioned hereinabove, an output port heating element 100 mounted on an external surface 102 of the output port 60 therebetween the inlet and openings 62, 64 provides a second possible heating means (not shown) to the output port 60 by thermal conduction. Preferably, an electrical connection (not shown) between the heating element 100 and the source of electricity can also be controlled by the on/off switch 48 and the thermostat 52 and visualized by the light indicator 50.

Figure 3:
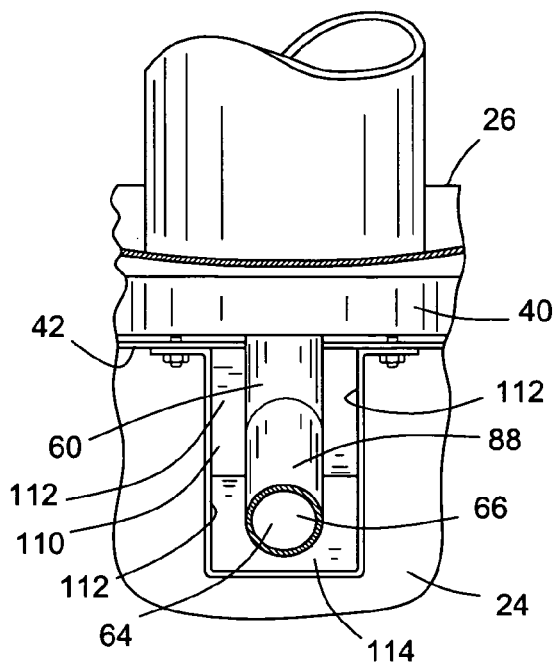
FIG. 3 is a simplified section view taken along line 3—3 of FIG. 2.
Figure 4:
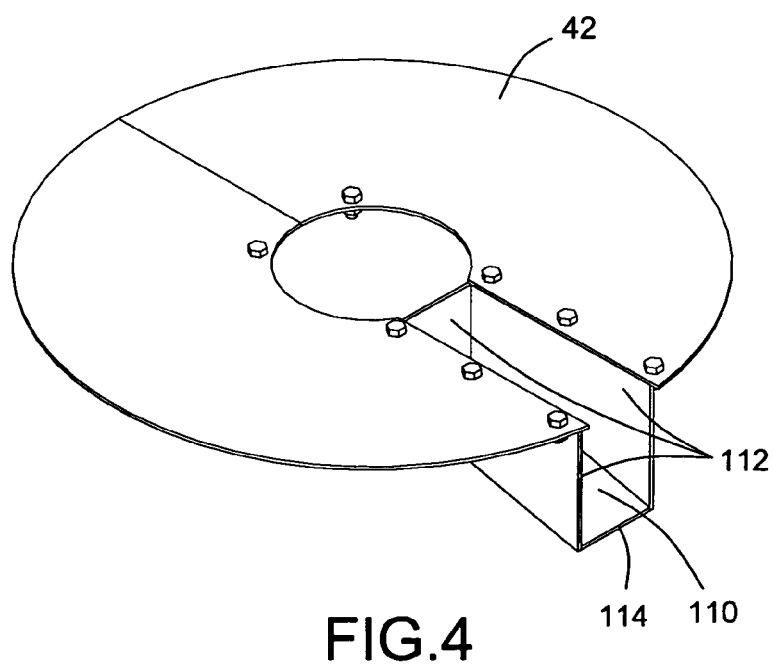
FIG. 4 is a perspective view of the heating chamber of FIG. 2.

As shown in FIGS. 2, 3 and 4, an output port chamber 110 forms an extension to the heater chamber 38 within the stand 24 in order to enclose at least a portion 88 of the output port 60. In the example shown, the output port chamber 110 is formed of generally vertical walls 112 secured onto the plate 42 and one lower wall 114 secured onto the vertical walls 112. One skilled in the art will understand that a section (not shown) of the plate 42 is preferably removed in order to have the output port chamber 110 in fluid communication with the heater chamber 38. Preferably concomitantly to the thermal conductive connection from the recipient 26 mentioned hereinabove, the fluid communication between the output port chamber 110 and the heater chamber 38 provides when the apparatus 10 is switched on a third possible heating means (not shown) to the output port 60 by thermal radiation from the heater element 36. If desired, the use of both the output port heating element 100 and the output port chamber 110 are used concomitantly also to the thermal conductive connection from the recipient 26 mentioned hereinabove to provide the combined second, third and first heating means respectively to the output port 60. As understood by one skilled in the art, any combination of the above-mentioned heating means can be used with the apparatus 10. Also, other heating means (not shown) could be applied onto the output port 60 without departing from the scope of the present invention. For example, a heating element mounted within the opening mechanism 68 and extending inwardly and substantially axially into the passageway 66.

The material used to manufacture most parts of the apparatus 10 shall comply with the Food and Drug Administration Regulations or the like. It is moreover important as stated earlier that some parts of the apparatus 10 be thermally conductive in themselves and in their joints (not shown). Accordingly therefore, the recipient 26 and the output port 60 specifically are preferably manufactured using standard stainless steel.

Operation

The apparatus 10 operates as a standard chocolate fountain known in the art and offers more options to a user (not shown). If the user believes the offer of putting chocolate topping onto a dessert is an appropriate function, he replaces the stopper 70 with another opening mechanism 68 such as a valve 72 combined to preferably a manual actuator 78, and adds a chosen spout 80. As one skilled in the art will understand, the preferably already warmed up food media FM is then put in the recipient 26 and fills the output port 60 by going from the aperture 32 and the inlet opening 62 into the passageway 66. The apparatus 10 is then turned on using the switch 48 and the food media FM such as chocolate stabilizes toward the desired temperature range by using if necessary the thermostat 52. One skilled in the art will understand that the activation of the switch 48 and the thermostat 52 in effect translate into the output port 60 being warmed or heated up by one of the heating means combination explained hereinabove. The user then activates the valve 72 by pulling or pushing on the manual actuator 78 or the like such as shown with arrow A1 on FIG. 2. The warm fluid food media FM such as melted chocolate that has filled the passageway 66 then flows through the outlet opening 64, into the valve 72 and spout 80, to come out the orifices 82 with an output flow 86 onto the dessert or other positioned below by the user. When enough food media has flowed, the manual actuator 78 is released and the food media FM flow stopped. If another type of output flow 86' is wished by the user, another spout 80' with different orifices 82' is easily put in place in lieu of the previous spout 80.

Once the apparatus 10 is not used for dispensing food media FM such as melted chocolate anymore, the user preferably needs to empty and clean the apparatus 10 of the food media FM. As one skilled in the art will understand, a supplemental and useful application of the output port 60 is to be used as a drainpipe for the food media FM, for a cleaning/rinsing agent or fluid or the like. Generally, a warmed and soapy liquid such as water is put in the recipient 26. During and/or after cleaning and eventually rinsing the parts, the user activates the opening mechanism 68 to ensure the dirty liquid is expelled easily from the recipient 26 of the fountain apparatus 10 through the passageway 66 of the output port 60.

Although the present apparatus has been described with a certain degree of particularity, it is to be understood that the disclosure has been made by way of example only and that the present invention is not limited to the features of the embodiments described and illustrated herein, but includes all variations and modifications within the scope and spirit of the invention as hereinafter claimed.

I claim:

1. A fountain apparatus for use with a flowable food media, said apparatus comprising:

a recipient for selectively receiving the flowable food media therein, said recipient being heatable within a predetermined temperature range for maintaining the flowable food media within said predetermined temperature range, said recipient having an aperture extending through a wall thereof;

an output port connecting to said recipient downstream of said aperture, said output port having a passageway extending therethrough for receiving the flowable food media from said aperture, said passageway defining an inlet opening being in fluid communication with said recipient via said aperture and an outlet opening, said outlet opening having an opening mechanism to selectively control opening thereof;

a heating means thermally connected to said output port for warming said output port to maintain the flowable food media therein within said predetermined temperature range.

2. The apparatus of claim 1, wherein said heating means is a thermally conductive connection between said output port adjacent said inlet opening and said recipient so that said recipient heats up said output port through said thermally conductive connection.

3. The apparatus of claim 1, wherein said heating means is at least one heating element mounted on an external surface of said output port between said inlet and outlet openings.

4. The apparatus of claim 1, further including a heater element operatively connected to said recipient, said heater element being located within a heater chamber adjacent said recipient to maintain said recipient within said predetermined temperature range.

5. The apparatus of claim 4, further including an output port chamber enclosing at least a portion of said output port, said output port chamber being in fluid communication with said heater chamber so as to warm up said output port within said predetermined temperature range; whereby said heater element forms said heating means.

6. The apparatus of claim 5, wherein said output port chamber is an extension of said heater chamber.

7. The apparatus of claim 4, wherein at least a portion of said output port extends through said heater chamber so as to warm up said output port within said predetermined temperature range; whereby said heater element forms said heating means.

8. The apparatus of claim 1, wherein said opening mechanism includes a valve operatively connected to an actuator.

9. The apparatus of claim 8, wherein said actuator is a manual actuator for selective operation by a user.

10. The apparatus of claim 1, wherein said output port includes a spout removably connecting thereto and being in fluid communication with said outlet opening.

11. The apparatus of claim 10, wherein said spout includes a plurality of orifices, said orifices being angled from one another so as to provide respective output flows.

12. The apparatus of claim 1, wherein said recipient wall has a concave inner surface defining an apex region thereof, said aperture being positioned adjacent said apex region.

* * * * *